United States Patent [19]

Young

[11] Patent Number: 4,944,572

[45] Date of Patent: Jul. 31, 1990

[54] VARIABLE ASPECT DISPLAY

[76] Inventor: Clinton J. T. Young, c/o Outlook Engineering Corporation, P.O. Box 2185, Alexandria, Va. 22301

[21] Appl. No.: 236,101

[22] Filed: Aug. 24, 1988

Related U.S. Application Data

[60] Continuation-in-part of Ser. No. 47,829, May 6, 1987, abandoned, which is a division of Ser. No. 766,379, Aug. 16, 1985, Pat. No. 4,663,871, which is a division of Ser. No. 457,607, Nov. 13, 1983, Pat. No. 4,542,958.

[51] Int. Cl.[5] ........................ G09F 19/14; G03B 25/02

[52] U.S. Cl. .................................... 350/167; 350/131; 40/454

[58] Field of Search ................... 350/167, 131; 40/454

[56] References Cited

U.S. PATENT DOCUMENTS

| | | | |
|---|---|---|---|
| 771,824 | 10/1904 | Ives . | |
| 1,475,430 | 11/1923 | Curwen . | |
| 2,432,896 | 12/1947 | Hotchner | 40/130 |
| 2,827,720 | 3/1958 | Phillippi | 40/137 |
| 2,833,176 | 5/1958 | Ossoinak | 88/16 |
| 3,237,331 | 3/1966 | Gill, Jr. | 40/137 |
| 3,314,179 | 4/1967 | Leach | 40/137 |
| 3,357,770 | 12/1967 | Clay | 350/131 |
| 3,468,545 | 9/1969 | Anderson | 273/183 |
| 3,568,346 | 3/1971 | Smith | 40/125 |
| 3,796,484 | 3/1974 | Forster, Jr. | 350/31 |
| 3,844,635 | 10/1974 | Atkins | 350/104 |
| 3,907,420 | 9/1975 | Vevich | 353/121 |
| 4,420,221 | 12/1983 | Sparks | 350/167 |

FOREIGN PATENT DOCUMENTS

| | | |
|---|---|---|
| 1446839 | 5/1969 | Fed. Rep. of Germany . |
| 1185129 | 7/1959 | France . |
| 2143138 | 2/1973 | France . |
| 83/03227 | 9/1983 | PCT Int'l Appl. . |
| 400314 | 5/1932 | United Kingdom . |

*Primary Examiner*—Bruce Y. Arnold
*Assistant Examiner*—Terry S. Callaghan
*Attorney, Agent, or Firm*—Biebel, French & Nauman

[57] ABSTRACT

The light incident upon a lenticular parallax panoramagram variable aspect display is imaged upon the object field and then distributed in part across portions of the object field outside the images. Adjustment is made for the rate at which the display changes as a function both of the rate of movement of the viewer past the display, and of the instantaneous absolute angular position of the viewer with respect thereto. Adjustments can also be made for parallax, lens circular aberration at off-center viewing angles, differential thermal expansions within the sign, and display changes due to changes in ambient conditions. Each lens element is preferably provided with its own exclusive object field.

4 Claims, 9 Drawing Sheets

VARIABLE ASPECT DISPLAY

RELATED APPLICATION

This application is a continuation-in-part of application Ser. No. 047,829, filed May 6, 1987, now abandoned; which is a division of application Ser. No. 766,379, filed Aug. 16, 1985, now U.S. Pat. No. 4,663,871; which is a division of application Ser. No. 457,607, filed Jan. 13, 1983, now U.S. Pat. No. 4,542,958.

BACKGROUND OF THE INVENTION

The present invention relates to lenticular parallax panoramagrams, and more particularly to a variable aspect display capable of providing significant visual information which changes according to predetermined conditions. The changes occur in most cases without requiring any internal energy within the display, thereby making it useful for many specialized as well as conventional applications.

Lenticular paralax panoramagrams have been known for over a half-century, and precursors operating on similar principles extend back yet another quarter century. Although these and other prior art devices have suggested diverse applications for lenticular parallax panoramagrams, and although the literature shows multi-lens structures conceptually similar to lenticular parallax panoramagrams, their commercial use has been limited almost exclusively to novelty items. For more serious applications, such displays must provide performance and reliability features generally lacking in known lenticular parallax panoramagram configurations.

In the broadest sense, such a panoramagram may be defined as a patterned field which is set at or near the foci of a group of lenses so that a viewer at a considerable distance sees only the parts of the field that are substantially at conjugate focal positions with respect to his eyes. Known prior art configurations meet this definition, but as indicated, their use in more sophisticated applications, such as traffic control and/or warning signs, is not presently being realized.

The traffic sign provides a good example of both the great advantages which are possible with a variable aspect display, and the considerable practical difficulties associated therewith which, in large measure, may account for the lack of satisfactory designs beyond that of the novelty type. Of the advantages, perhaps most noteworthy is the ability of such a sign to capture the viewer's attention. Consider the effect, for example, of travelling along a darkened rural highway at night, with a yellow sign ahead warning of a curve. If, upon nearing the sign, it suddenly started "flashing" at the driver, either alternately appearing and disappearing, alternating its colors (e.g., yellow, black, yellow, etc.), or changing its message altogether, the effect upon the driver's attention would be remarkable.

Other examples can include an arrow which alternately extends and retracts, a "progressive" message which advances through several stages (either textual or graphic), as well as many other varieties. As taught later herein, the rate at which the display changes can also be varied according to conditions. Ideally, such a sign would require no artificial illumination during the day or night. Nighttime illumination would be provided by the automobile headlights, so that no internal energy source would be required. As it is, however, the prior art has failed to provide such a sign.

In looking for the reasons for this failure, consider first that a traffic sign must be clear and unambiguous. This means that the display which is presented must at all times be a precise function of the positional relationships between the viewer and the sign, and must preferably be capable of being tailored to each particular anticipated viewing position. This is a virtual impossibility where the lens elements share display elements with adjacent lenses, a dominant feature of conventional lenticular parallax panoramagram constructions. Further, the circular aberration of simple, inexpensive lenses at off-center viewing angles may not provide sufficient distinctness and sharpness for such applications.

An even greater limitation, as explained further hereinbelow, may render such a sign all but useless at night. Typically, the source of illumination at night would be the automobile headlights, and the lens system will focus the light from the headlights upon corresponding conjugate portions of the object field. The light reflected therefrom will then be focused and returned by the lenses, not to the driver, but to the headlights. Thus the conjugate portions of the object field corresponding to the angular positions of the headlights will be illuminated, but those corresponding to the angular positions of the driver's eyes typically will not.

The significance of this condition, of course, varies as a function of the relative angles, distances, and quality of the optics, and may not be significant at great viewing distances. However, as the viewer approaches the sign, the problem would be increasingly aggravated. In fact, experiments have shown that even when inexpensive, optically inferior commercially available fluted glass is used for lens elements, angular deviations between the headlights and the driver's eyes of less than one degree will cause the sign to appear dark at night when illuminated by the headlights.

Still other problems of a practical nature must be considered. Signs of a considerable width as seen from the viewer's position may require correction for parallax. Signs which are exposed to daily and seasonal temperature variations may suffer from differential rates of thermal expansion and contraction between the lenticular lens screen and the object field, causing relative displacement and misalignment of lens and field elements, and obscuring the display.

A need thus remains for a variable aspect display which provides the substantial advantages potentially available with a lenticular parallax panoramagram, but which overcomes its disadvantages. Such a variable aspect display should lend itself to use in the widest variety of applications. It should be durable and reliable, yet inexpensive and readily suited to convenient mass production.

SUMMARY OF THE INVENTION

The present invention meets the above needs with a parallax panoramagram variable aspect display which includes various features for overcoming the numerous disadvantages mentioned above. Principally, the display includes a lenticular screen having a series of discrete lens elements, and an object field supported behind the screen at or near the foci of the lens elements.

The object field is divided into a plurality of lens fields, each lens field having a pattern. Additionally, each lens field corresponds to one of the lens elements, and extends across substantially the entire angle corresponding to the intended range of viewing directions for the variable aspect display. The patterns within the lens fields are each divided into a plurality of conjugate display elements selectively visible to a viewer through the lenticular screen as a function of the angular position of the viewer in relation thereto.

The display further includes light displacing means for displacing light incident upon the variable aspect display to distribute a portion thereof across portions of the object field outside the images of incident light focused upon the object field by the lens elements. This means is provided for illuminating these portions of the lens field patterns and making them visible to a viewer of the variable aspect display whose angular relation to the display differs from that of the source of the light incident thereupon.

The light displacing means may take one of several forms, including a means for receiving light outside the lenticular screen and guiding it to illuminate the lens field pattern. This means can be at least one reflective surface disposed to receive light incident thereupon and to direct it to the object field, or may be at least one optical conductor, such as a light rod, that receives light at a first end and directs light from its second end onto the object field.

The light displacing means may also include means for receiving light after it passes through and is refracted by the lenticular screen, for displacing a portion of the light laterally with respect to the focal positions corresponding to the lens elements to illuminate portions of the object field. This means may be a coarse retroreflector, such as transparent beads, corner reflectors, cylindrical lenses, or the like. If the patterns of the lens fields include at least partially transmissive portions, the light receiving and displacing means may be a light confining structure, such as transparent blocks, that confine light by internal reflection that is incident upon the transmissive portions of the patterns, and return the light to the lenticular screen after displacement.

Each lens field used within the variable aspect display may be shaped and positioned with respect to its respective lens elements to place each point of the pattern carried thereon at a distance from the lens element substantially compensating for the curvature of field of the lens element at off-center viewing angles. This may be accomplished by curving the field corresponding to the lens so that it lies within the curved surface defined by the focal points of the corresponding lens element for different viewing directions. Alternatives may include approximating a curve with straight surfaces, or extending the lens field patterns onto baffles positioned between adjacent lens fields.

The conjugate display elements on each of the lens fields may have their relative spacings or widths selected to produce at least two different spacings for the display elements along the object field. One of the spacings is selected for each of the lens fields, so as to compensate at least partially for parallax at a series of predetermined viewing distances and angles. A unique spacing may be selected for each of the lens fields to more closely correct for parallax.

The display elements may also have their relative spacings or widths selected to compensate at least partially for the changing rate of viewing angles through which the viewer proceeds while moving at constant speed and direction toward the display. To obtain a constant rate of change throughout an image sequence, display elements may be spaced progressively further apart throughout the sequence.

The display may be constructed so that each of the lens fields has at least two different independent patterns, with a means for controllably changing the distribution of illumination of the object field to illuminate the independent pattern selectively being provided. The image presented to a viewer by the variable aspect display can thereby be changed by changing the illumination of the object field. This means may be selectively illuminable light guide systems for each of the patterns, or may be a grid corresponding to the patterns of the lens fields that is movable over the patterns for selectively covering or exposing them to produce corresponding changes in the images presented to the viewer.

A means for compensating for lateral thermal displacements betweens the lens elements and the object field may be provided. Where the lens elements utilized are mutually parallel cylindrical lenses, this means may include means dividing the object field longitudinally with respect to the cylindrical lens elements into a plurality of longitudinal sections. The sections are then connected substantially independently of each other to the lenticular screen in initial proper registry therewith, to reduce the net effective widths over which differing thermal expansions can take place.

Thus the present invention provides a variable aspect display that is well adapted for use as a traffic sign in a variety of situations. Additionally, the variable aspect display can be used in a number of different applications, such as for use in controlling aircraft, for advertising displays, and many other uses.

It is therefore an object of the present invention to provide an improved variable aspect display having means for laterally displacing light incident upon the display to illuminate portions of the object field outside the images of the incident light focused thereupon;

to provide such a display having an object field divided into a plurality of lens fields, one lens field corresponding to each lens;

to provide such a display in which the elements of each such lens field may be individually selected to provide predetermined conjugate displays as a direct function of the particular angle of the view with respect to the display and independently of the display seen at other angles;

to provide such a display in which the rate of display change may be selected according to the particular absolute angle at which the variable aspect display is being viewed;

and to provide such a display that accomplishes these and other purposes in an inexpensive, durable, and reliable configuration readily suited to convenient use in the widest possible range of applications.

Other objects and advantages will be apparent from the following description, the accompanying drawings, and the appended claims.

DETAILED DESCRIPTION OF THE PREFERRED EMBODIMENTS

The present invention provides a lenticular parallax panoramagram as a variable aspect display that includes a number of features making the invention particularly suited for use as a traffic control sign. A number of other applications are also contemplated for the invention, however, several of which will be discussed below.

Referring to FIGS. 1 and 2A–2C, one use of the variable aspect display as a traffic control sign can be seen. The sign 10 is erected along a highway 12 at, for example, the approach to a curved portion thereof. The sign 10 is placed in a position such as. is typical for highway signs, so that the sign 10 is visible to the driver of a vehicle 14 travelling along highway 12.

Figure 1:
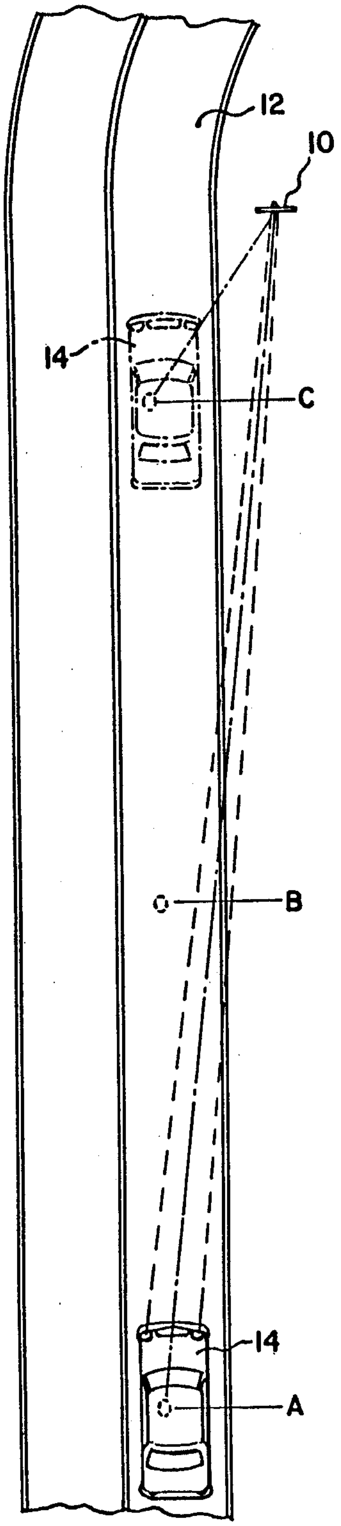
FIG. 1 is a plan view illustrating use of the variable aspect display as a traffic sign, and showing the display as viewed from three different viewing angles.
Figure 2C:
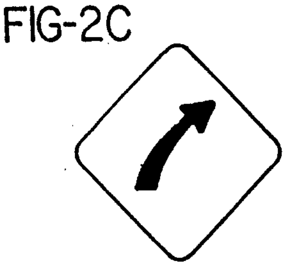
FIG. 2C illustrates the image presented by the display to a viewer at position C of FIG. 1.
Figure 2B:
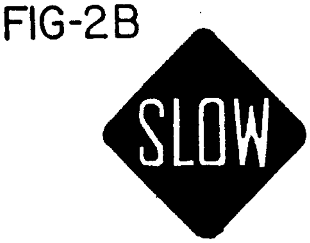
FIG. 2B illustrates the image presented by the display to a viewer at position B of FIG. 1.
Figure 2A:
FIG. 2A illustrates the image presented by the display to a viewer at position A of FIG. 1.

As the vehicle 14 approaches the sign 10 so that the vehicle driver is at the position indicated as "A", the sign 10 will display an indication to the driver such as that shown in FIG. 2A. As the vehicle 14 proceeds to the point where the driver is at the position indicated by "B", the sign 10 will change the display presented to the driver to that shown in FIG. 2B. Similarly, as the vehicle 14 moves the driver to position "C", the sign 10 presents the display shown in FIG. 2C.

Figure 3:
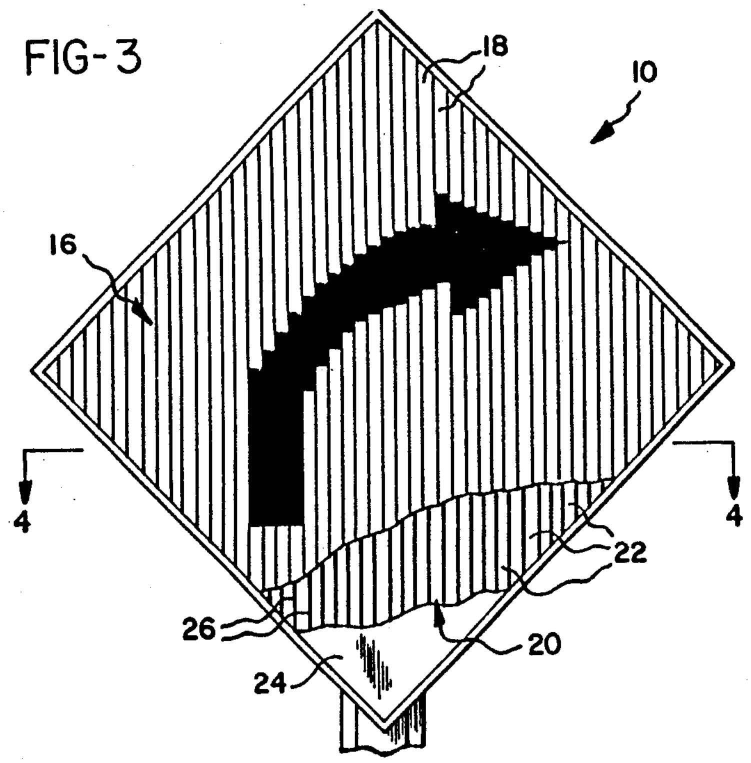
FIG. 3 shows a front elevational view the variable aspect display used as a traffic sign, with portions of the lenticular screen and object field broken away.
Figure 4:
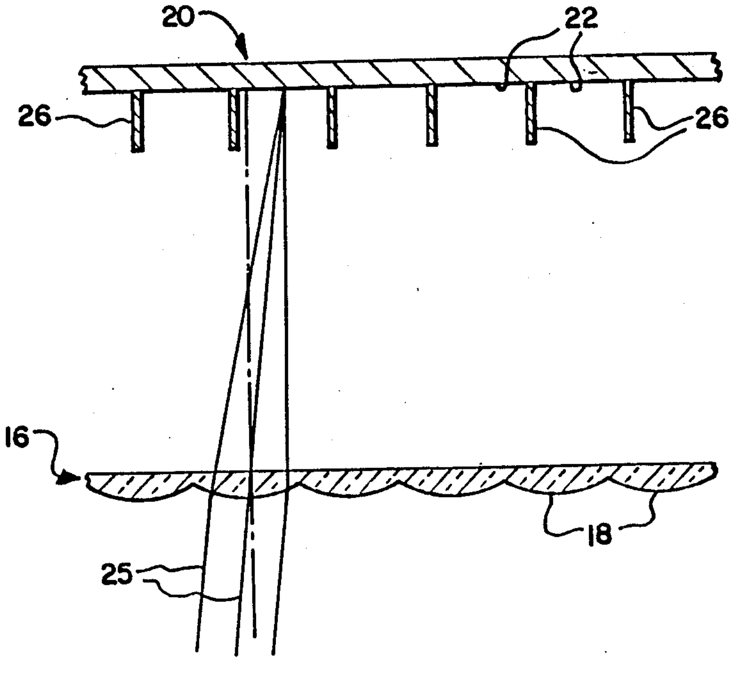
FIG. 4 is a view taken generally along line 4—4 of FIG. 3.

The operation of the sign 10 for presenting the variable displays of FIGS. 2A–2C may be understood by considering the particular structure of the sign 10. One embodiment is shown in FIGS. 3 and 4, in which the sign 10 includes a lenticular screen 16 having a plurality of discrete lens elements 18. While this particular embodiment uses as the lens elements 18 a plurality of mutually parallel cylindrical lenses, it is to be understood that the lenticular screen 16 may, in the alternative include an array of spherical lenses. Other shapes of lens elements ,re also usable. For example, when lenses of circular cross-section are used, they may exhibit undesirable aberration if their width is too great in relation to focal length. Greater widths or shorter focal lengths may be desirable in some cases, for instance to increase the working angular width of the system. This difficulty may be overcome by use of acircular or aspherical lenses. The lens structure may also include reinforcement or other means, such as tempering in the case of glass, to make it more resistant to mechanical damage.

Supported behind the lenticular screen 16 at or near the foci of the lens elements 18 is an object field 20 divided into a plurality of lens fields 22. The object field 20 may be self supporting, or it may be mounted to a support member 24. Additionally, the lenticular screen may be made sufficiently thick that the object field 20 can be mounted directly thereon, producing a solid unit.

Each lens field 22 corresponds to a particular lens element 18, and is positioned such that a light ray impinging upon a lens element 18 will be directed thereby onto the corresponding lens field 22. Each lens field 22 extends across substantially the entire intended viewing angle for its respective lens element 18 for the intended range of viewing directions for the sign 10.

Each lens field 22 is provided with a pattern divided into a plurality of display elements conjugate to various viewing positions distributed across the lens field 22 so that each element is selectively visible to a viewer through the lenticular screen 16 as a function of the angular position of the viewer in relation thereto. Thus as the viewer changes his angular position, the particular display elements visible to him will change. Properly placing the elements along each lens field 22 will cause the overall effect to be that of the sign 10 changing its entire display or its display in part of its area.

It is important to recognize that all of the display elements to be visible through any one of the lens elements 18 are contained within the particular corresponding lens field 22. This differs from many prior art devices wherein a display element that may serve one lens element from one viewing angle will serve an adjacent lens element at a second viewing angle, and also the next adjacent lens element at a third viewing angle.

While this procedure greatly simplifies the object field 20, it is not practical in high-precision applications such as highway signs, since the increasing path length through the lenticular screen causes the display to become progressively more aberrated. More importantly, the angular change required in such an application is too large to fit the range of viewing angles typical of highway situations. Additionally, it can be seen that as the display elements along a planar object field are positioned further from the particular lens elements through which the object field is viewed, the display elements are positioned further from the focus of the lens element at that viewing angle. Thus further aberration and defocussing ar introduced.

Figure 4A:
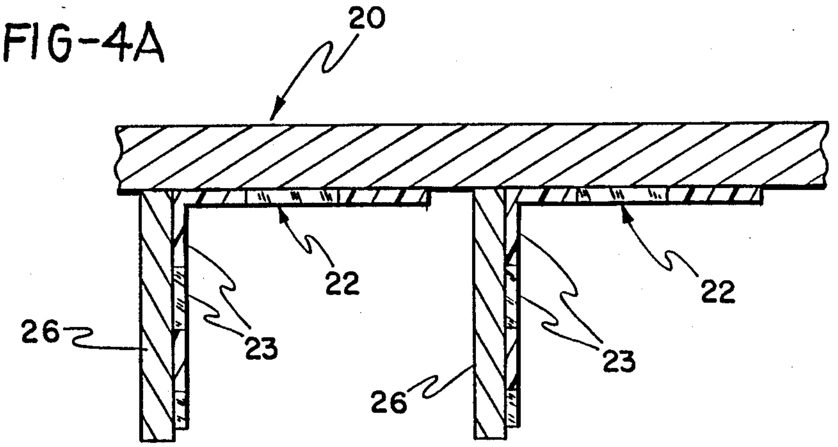
FIG. 4A is an enlarged view of a portion of FIG. 4 showing the pattern formed on the object field.

In some situations, depending upon the particular lens elements 18 used and the particular angles from which viewing of the sign 10 is anticipated, it may be necessary to provide optica baffles 26 between the individual lens fields 22. The baffles 26 may serve as a portion of the lens field 22, with one or more of the display elements 23 being positioned thereon, as shown in FIG. 4A.

One limited exception to complete correspondence between lens elements 18 and lens fields 22 should be noted. In some situations, the particular display elements utilized at the extreme ends of the viewing range may be the same. In such a case, the lens fields 22 may be slightly overlapped, with the first display element of one lens field serving as the final display element of an adjacent lens field. The overlapped portion is sufficiently close to both lens elements involved that any aberrations or other disadvantages resulting from such a configuration are negligible. Use of this slight overlapping of lens fields may permit simplification of the object field as a whole, for instance by the elimination of the baffles 26. Additionally, it extends the available angular range of the lens field.

Figure 5A:
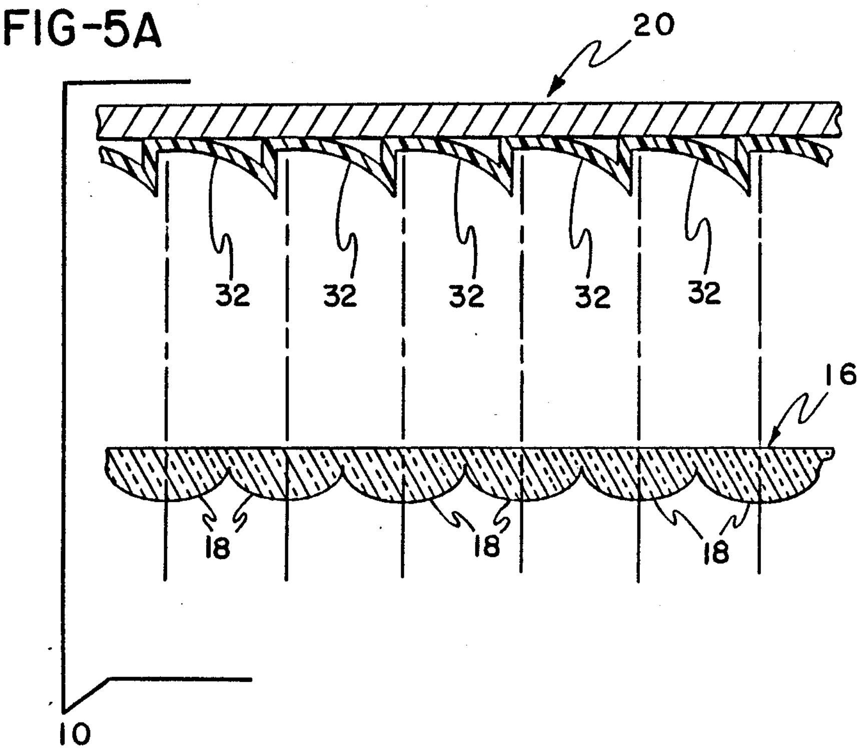
FIG. 5A is a sectional view of a portion of the lenticular screen and lens and object field showing an offset relationship between the lens fields and lens elements.
Figure 5:
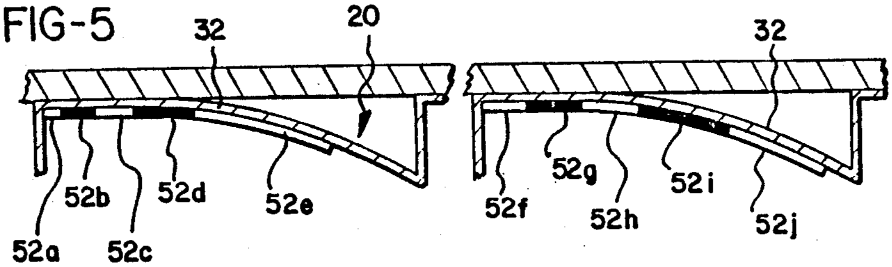
FIG. 5 is a sectional view of a pair of lens fields utilized in one embodiment of the present invention.

It can be seen from FIG. 4 that use of a planar object field 20 results in a variation of focus through the lens fields 22, due to the increasing distance to a lens field 22 from its corresponding lens element 18 as viewing angle increases. An alternative arrangement for object field 20 that corrects this problem is shown in FIG. 5. Non-planar lens fields 32 are provided, each having a curvature such that the display pattern carried thereon will lie within the focus of the corresponding lens element regardless of the viewing angle. In the case of the cylindrical lenses 18, the lens field 32 will likewise be cylindrical. It will be recognized that in the event other shapes of lens elements are used, the lens fields will be configured accordingly. In particular, the curved surfaces shown may be constructed as a molded plastic assembly or from sheet metal corrugated into the proper shape. Lens element structures providing correction for curvature of field can also be used.

As an alternative to the smoothly curved surfaces of lens fields 32, the correction of the object field to correspond to the foci of the lens elements can be provided by a stepped lens field which can be built up from the planar supporting surface. While such a structure will, of course, provide accurate correction only at a finite number of viewing angles, deviations within the range of each step can be made negligibly small. In some instances, this type of arrangement may facilitate construction of the object field.

As a third alternative, baffles may be positioned between the lens fields with the display pattern extending onto the baffles. Such an arrangement has been shown and discussed in connection with FIG. 4A, but can also be used to obtain some correction for curvature of field.

In general, correction for curvature of field can be obtained by extending at least a portion of each lens field towards the lenticular screen. In the case of the embodiments shown in FIGS. 5 and 4A, a portion along one edge of each lens field is so extended.

In any of the alternatives to correct for curvature of field described above, a possible added advantage is the shielding of adjacent lens fields from view through non-corresponding lenses. Certainly, in the case of baffles, such shielding is present. However, consider also FIG. 5. It would not be possible, for example, to view display element 52*f* through the preceding lens element, since this display element will be shielded by the preceding non-planer lens field. Of course, the extent of the shielding produced will depend upon the extent to which the lens field extends toward the lenticular screen.

Also, it should be noted that correction for curvature of field is most important at the outer ranges of the intended viewing angles for the variable display. Such correction thus enables lens fields to be positioned in a non-symmetrical or offset relationship with respect to the corresponding lens elements. See, for example, FIG. 5A. Taking the midpoint of a lens element 18 of lenticular screen 16, it can be seen that the major portion of the corresponding lens field 32 lies to one side of the lens element midpoint. This arrangement, made more effective through correction for curvature of field, will be better understood after review of the remainder of this specification. It enables the display device 10 to be better used where the viewer is to pass to one side of the device, as is typical with roadside signs. Further, it can be used with or without the additional shielding effect which can be produced by the non-planar lens fields. The degree of offset will, of course, depend upon the particular application.

Figure 6:
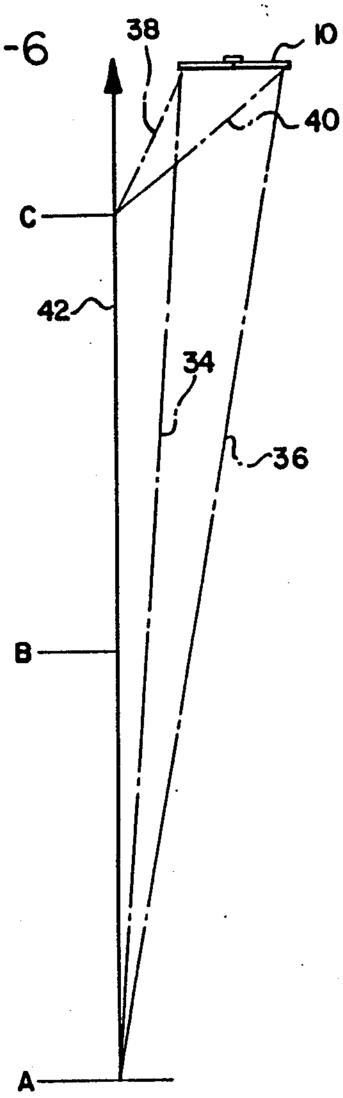
FIG. 6 is a diagram illustrating the effect of parallax upon a variable aspect display.
Figure 7:
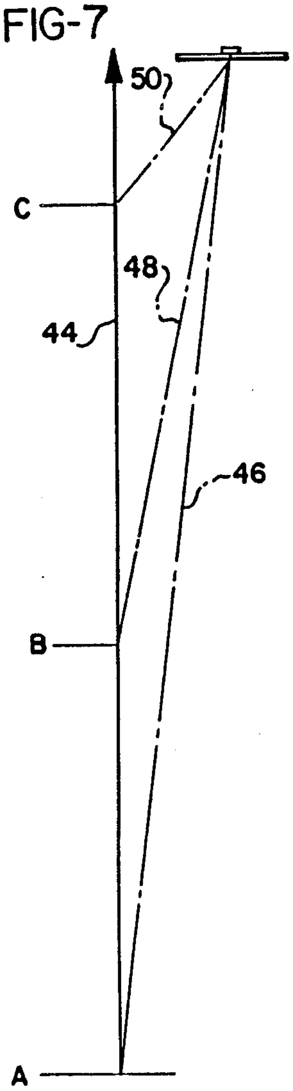
FIG. 7 is a diagram illustrating variation in rate of viewing angle change as a function of movement toward the variable aspect display.

Two further problems are illustrated in FIGS. 6 and 7 for which the present invention provides related solutions. In FIG. 6, parallax across the width of the sign 10 can be seen by comparing angles formed at the sign 10 by the lines of sight 34 and 36 from viewing position A to the left and right sides of the sign 10, respectively. The effect is even more pronounced for lines of sight 38 and .40 from viewing position C, demonstrating that the viewing angle of the various lens fields from a single viewing point varies across the width of the sign 10. Thus, as the viewer moves along the viewing path 42, the differing viewing angles for different parts of the sign 10 cause the various display elements to come into view at different times. The result is that the change across the width of sign 10 from one display image to another is gradual rather than instantaneous.

A second problem is illustrated in FIG. 7, in that travel of the viewer of sign 10 along travel path 44 for equal distance increments does not result in equal incremental changes in the viewing angle of sign 10. For example, it will be noted that the distance along travel path 44 between points A and B and between points B and C is substantially the same. The change in viewing angle between points A and B, seen by reference to lines of sight 46 and 48, however, is significantly different from the change in viewing angle between points B and C, seen by reference to lines of sight 48 and 50. Thus, as the viewer travels along line 44, the rate of change between successive display images on the sign 10 will appear to the viewer to increase substantially as the viewer moves toward the sign 10.

The solutions to these problems provided by the present invention may be seen by referring back to FIG. 5. For purposes of example, the sign 10 to be considered will be a simple solid-color aspect that alternates between a light or dark color, such as yellow and black. Five different images are provided, each represented by one of the display elements 52*a*–52*e* or 52*f*–52*j* on each lens field 32. It is to be understood that the left lens field 32 represents a lens field positioned near the left edge side of sign 10, while the right lens field 32 represents a lens field from the right edge of sign 10.

Correction for parallax is accomplished by gradually varying the spacings or widths of the various display elements 52 from one lens field 32 to the next across the width of the sign 10. Accordingly, it can be seen that the display elements 52*a*–52*e* occupy a smaller portion of their respective lens field 32 than the display elements 52*f*–52*j*. Thus viewing the sign 10 along lines of sight 38 and 40 of FIG. 6, for example, will result in corresponding display elements (52*e* and 52*j*) being simultaneously in view. It will be further understood that the lens field 32 located along sign 10 between those shown in FIG. 5 will be provided with display elements 52 of intermediate widths with respect to those shown therein. The display image of the sign 10 will therefore always be in phase, with simultaneous changes in the image occurring across the entire width of the sign.

While the relative widths of the display elements 52 to compensate for parallax have been described in terms of producing a simultaneous image change across sign 10, it should be realized that in some instances, it may be desirable to have non-simultaneous change in the sign display. One example is a sign where a directional arrow alternately extends and retracts. In such a case, the principle described above will be again employed, with the width of the various display elements being adjusted so that parallax and "counter-parallax" are deliberately produced. This will then achieve the desired rate and degree of apparent image movement along the sign 10.

The solution provided to achieve a constant rate of image change is generally related to that used to eliminate parallax, and may also be seen by reference to FIG. 5. As has been previously noted, travel toward the sign 10 causes initial images to change more slowly than those later in the sequence. This can be eliminated if the later display elements are made relatively wider than those of the initial image. Accordingly, it can be seen in FIG. 5 that display elements 52*e* and 52*j* are substantially wider than elements 52*a* and 52*f*, respectively Similarly, the remaining display elements are of widths intermediate the outer elements.

Thus the relatively low rate of viewing angle change corresponds to the narrow display elements, while the relatively rapid changes in viewing angle correspond to the wider elements. By appropriately selecting the relative lengths of the elements, the rate of change between successive images in a series may be made constant. It should, of course, also be recognized that appropriate selection of the relative widths of the display elements within a single lens field may be selected to produce other desirable rates of change.

Figure 8:
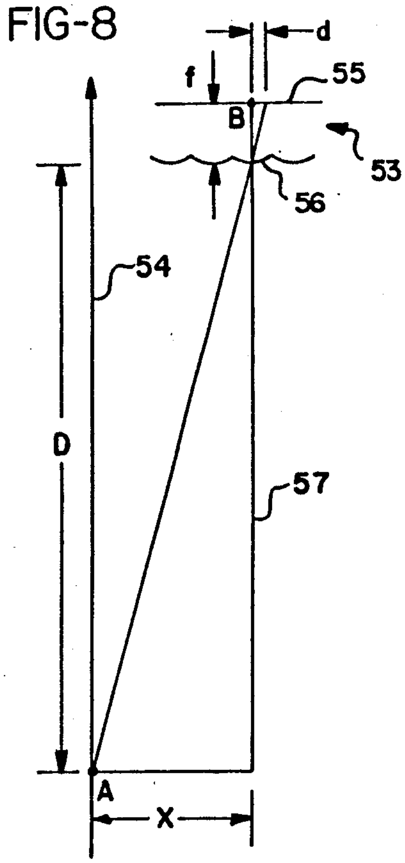
FIG. 8 is a diagram illustrating a technique for selection of the proper relative widths on spacings of the display elements of a particular lens field.

A preferred method for determining the necessary relative widths of display elements; such as those shown in FIG. 5, for producing a desired rate of change of display images may be seen by reference to the diagram of FIG. 8. A portion of a sign 53 is shown, toward which a viewer approaches along line 54. It may be desired, for example, that display of a particular image begin when the viewer reaches point A. The placement of a respective display element on object field 55 corresponding to lens element 56 is determined from the similar triangles shown in FIG. 8, where line 57 represents the lens axis of lens element 56. It can be readily seen that $$\frac{d}{f} = \frac{x}{D}$$

Since f, x and D are measurable quantities, d can easily be determined. This value then represents the distance from point B at which the respective display element should begin.

This technique, in slightly modified form, may also be used to determine the particular relative widths for the display elements to correct for parallax across the display.

While the variation in relative width of the display elements, both within single lens fields and from one lens field to the next, is necessary for the reasons discussed above, construction of the sign may be facilitated by defining a number of "zones" across the width of the sign, and introducing changes to the widths of the various design elements only at the zone boundaries. Each zone will thus include a plurality of lens fields having uniform pattern widths, and while some error will be introduced by this technique, selection of a sufficiently large number of zones can make any such error negligible.

Figure 9:
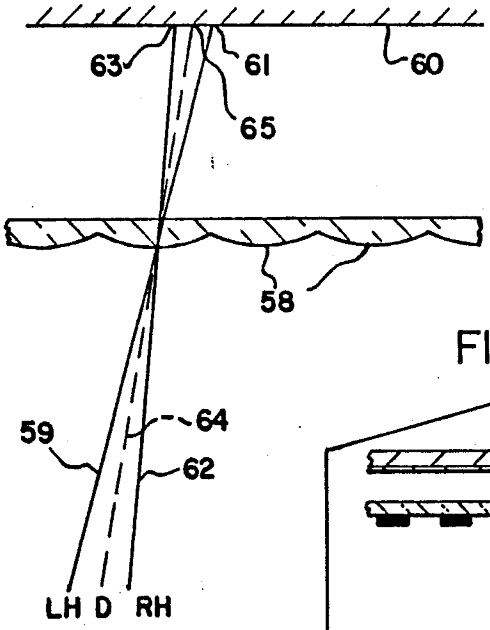
FIG. 9 is a sectional view of a portion of the lenticular screen and object field, illustrating the problem caused by angular separation of the headlights of a vehicle from the view of the display.

A further problem solved by the present invention is illustrated by the use of the variable aspect display as a highway sign at night. For night time operation, illumination of the sign will result almost entirely from the vehicle headlights, which roughly approximate point sources. The optical structures of the lens elements cause the light from the headlights to be focused into relatively discrete locations. With the cylindrical lenses of the preferred embodiment, as seen in FIG. 9, the light from a compact source such as a headlight will be focused into a thin strip by each lens element 58. Thus light from the left headlight, seen as line 59, is focused on object field 60 at 61, while light from the right headlight, seen as line 62, is focused at 63.

The effect is that the appropriate display elements, and hence the sign, will appear bright if the driver of the vehicle is in the same direction as one of his headlights, but will appear almost dark if his line of sight is between lines from the headlights to the sign, shown by line 64, which focuses to a strip passing through point 65. Since the latter situation is the case at most viewing angles, serious problems arise in using the sign at night. The lack of brightness can be prevented if illumination of the sign can be spread over the image field enough that there will always be some light in the display elements that the driver sees. Dispersing the light, however, at the lens elements or between them and the object plane is not possible, since the optical performance of the lens elements would be diminished and the image would be blurred.

Figure 10:
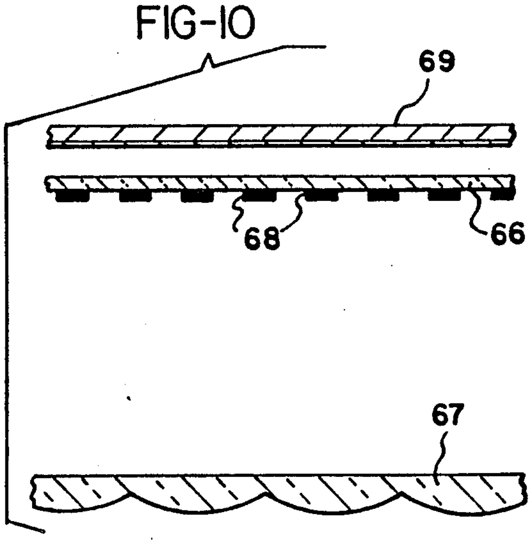
FIG. 10 is a sectional view of a portion of the lenticular screen, object field, and background screen as used in one embodiment of the present invention.

A simple method for increasing the overall brightness of the object field is illustrated in FIG. 10. The object field 66 mounted behind the lenticular screen 67 is constructed of an optically transparent material, with the darker portions of the design elements being placed onto the object field 66 and constructed of an opaque material 68, such as paint. A diffusely reflective surface 69 is mounted at a distance behind the object field 66, beyond the foci of the lens element of the lenticular screen 67. Thus as light passes through the transparent portions of object field 66 and beyond the foci of the lens elements, it spreads to illuminate a relatively larger portion of the reflector 69. The light returned from reflector 69 then serves to illuminate the object field for viewing angles other than those from which the light was initially incident.

Some brightness problem with the object field is also observed in diffuse illumination, such as in the case in daylight. It is in this situation that the method illustrated in FIG. 10 possesses disadvantages. In diffuse illumination, spreading shadows from the opaque elements 68 darken portions of the reflector 69 that should appear as bright. This effect can be lessened, as displacement of the reflector 69 from the opaque elements 68 is lessened. The separation needed to obtain the necessary offset can be reduced if the light is spread a small amount at the lens element focus or between the focus and the reflector 69. An ordinary optical diffuser can be used, but would be unnecessarily wasteful of illumination.

A more preferred diffuser is a low-angle, high-efficiency diffuser such as is commercially available from Outlook Engineering Corp. of Alexandria, Va. In such a diffuser, one or both surfaces of a transparent material are covered with very small, randomly positioned lenses of roughly equal focal length. Such a sheet gives only the small deviation of light rays required in this particular application and gives very little reflection of its own. A one-dimensional equivalent may also be used; it may take the form of a number of cylindrical lenses with axes substantially perpendicular to the direction in which illumination offset is desired.

Figure 11:
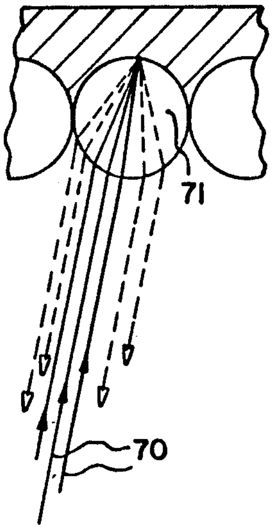
FIG. 11 is a view showing a transparent bead used as a retroreflector.

A second method for supplying adequate illumination utilizes glass bead-type retroreflectors. As seen in FIG. 11, light coming from one direction, shown by lines 70, is focused within the bead 71 near the opposite side thereof. This rearward side of the bead 71 is embedded in or coated with reflective material so that the light is returned through the bead to the side from which it entered. In an ideal spherical reflector, in which the diameter of the bead 71 is identical to its focal length, the light reflected at the rear side of the bead would return through the bead and would be collimated thereby so as to return in precisely the direction from which it originally entered. In actuality, the sphere diameter typically is not its exact focal length, and spherical aberration is large.

Therefore, the image formed on the rear surface of the bead 71 is not a point, but rather a considerable area. If the reflective material in which the bead is embedded (such as an opaque plastic) or coated (such as paint) is a diffuse reflector, the light is returned diffusely from each point in the image. Therefore, the light returned from the bead 71 emerges after outward refraction from the bead 71 with considerable angular spreading around the direction from which it originally entered, and also through a larger area of the frontal surface of the bead. As seen from the forward direction, then, much of the area occupied by the bead appears to be illuminated.

Typically, the glass beads will be applied only to those portions of the display elements that are to appear bright. Application of the beads to dark areas will have a tendency to return some light, since dark areas are typically not perfectly black. This will tend to reduce the contrast between light and dark areas on the sign, and reduce its readability.

It will be recognized that in using the cylindrical lenses of the preferred embodiment, the spreading of light for adequate illumination need be in only one dimension. Thus, in the alternative, cylindrical rods may be used in place of spherical beads. In such a case, the axes of the rods are oriented substantially perpendicular to the direction in which the illumination is to be spread. It will be seen that this results in the rods being oriented essentially parallel to the cylindrical lenses of the lenticular screen.

Figure 12:
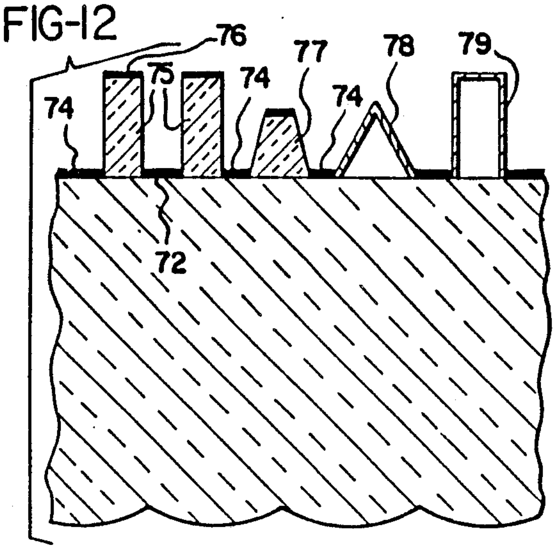
FIG. 12 is a sectional view of a portion of the lenticular screen and object field of a further embodiment of the present invention.

Another means for displacing incident light to provide adequate illumination is illustrated in several variations in FIG. 12. By way of contrast, a solid structure is used, and the object field is represented by the rear surface 72 of the lenticular screen. Dark display elements 74 may be defined by dark paint applied to the rear of the lenticular screen. In one example of this approach, blocks of transparent material 75 extend behind the object field 72 from bright areas of the display elements. A reflective paint 76 of an appropriate color is applied to the rearward portions of the blocks 75 which are attached to the object field 72 so as to allow light incident upon field 72 to pass freely into the blocks 75. Blocks 75 may be placed adjacent each other where necessary, with different colors of paint 76 being applied as appropriate.

The entering light is confined within the blocks 75 by internal refection, and is returned by the reflective paint 76. Thus the illumination is distributed within each of the blocks 75 so that upon emerging therefrom, the entire corresponding area on the object field 72 will appear bright. One variation is the use of a tapered block 77, in which the tapered sides enable a similar degree of light displacement to be obtained from a shorter block. Use of tapered blocks may be desirable as a space-saving technique.

A related technique, also shown in FIG. 12, utilizes highly reflective surfaces rather than transparent blocks. In one example, a corner reflector 78 is provided behind an area on the object field 72 which is to appear bright. Light entering the reflector 78 will be reflected from one side to the other, after which it will be directed back through the object field 72. The overall effect is to displace the incident light laterally, thereby increasing the apparent illumination of the object field 72 at the place conjugate to the viewer's eye. If a dihedral corner reflector is used, means of the type generally described in the present application may be used to assure that light from headlights will be returned at such angles of elevation as to reach the viewer's eyes.

Another variation utilizes the reflective structure 79, which can be considered an equivalent of the transparent blocks 75. Light enters the cavity created by the structure 79, is reflected from one or more of the surfaces therein, and emerges through the object field 72 displaced from the position at which the light was originally incident thereon. Reflection at the end of structure 79 may be diffuse.

In both of these latter cases, particularly with the corner reflector 78, the amount of offset of the illumination will be a discrete amount rather than the general spreading of illumination obtained with several of the other techniques described herein. Adequate coverage with these reflectors can be obtained, however, by positioning a number of them with slightly different orientations, such as in a progressive geometrical pattern, so that a number of degrees of lateral offset can be obtained. Additional distribution can be obtained by constructing the reflectors to be imperfect. This can be accomplished, for example, by varying the angles formed by the reflector surfaces, by curving the surfaces slightly, or by making the surfaces slightly diffuse. The defined cavity can be at least partially filled with a diffusing material, or the object field 72 can be partially diffuse.

It will be recognized that while a variety of means for offsetting illumination are shown in FIG. 12 for purposes of illustration, the particular means utilized will typically, but not necessarily, be uniform throughout the entire sign.

One further approach to supplying sufficient illumination to the object field of the sign is based upon supplying illumination other than that directly impinging upon the object field through the lenticular field. The most obvious way to accomplish this is to provide a source of illumination behind or adjacent the object field such as an electric lamp. Of course, this not only adds to the complexity of the construction of the sign, but also adds significant installation cost as well as maintenance and operational expense during the use of the sign.

Figure 13:
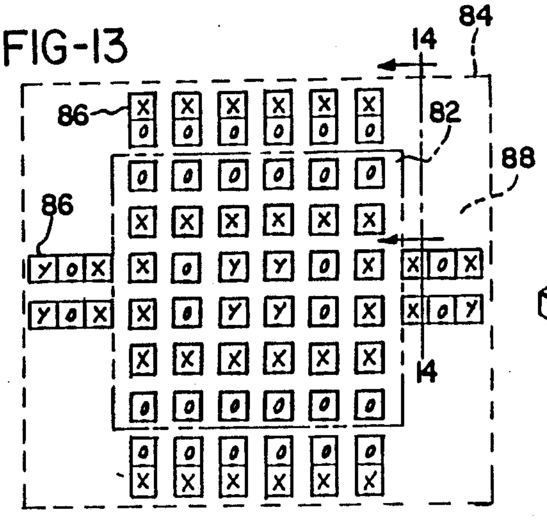
FIG. 13 is a diagrammatic view illustrating the use of light guides for directing light from the outer areas of a display to the inner areas thereof.
Figure 14:
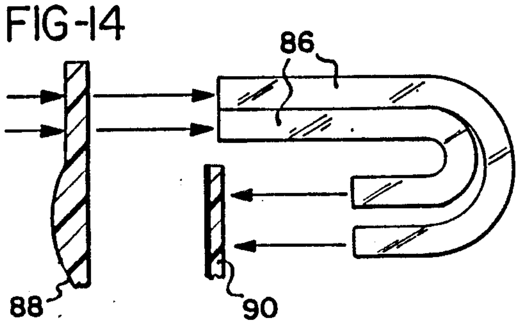
FIG. 14 is a diagrammatic view illustrating the operation of the light guides of FIG. 13.

A preferred approach is to direct illumination from either outside of the display's surface or from areas of the display where the illumination is not necessary. This can be achieved, for example, using sheet, bar, or rod light guides as illustrated in FIGS. 13 and 14. The sign 80 includes both an inner region 82, where additional illumination is required, and an outer region 84, where additional illumination is not needed. While both regions 82 and 84 maY be of the variable aspect construction described herein, in some applications only the inner region 82 need be provided with a variable aspect, the outer region 84 being of more typical sign construction.

Figure 15:
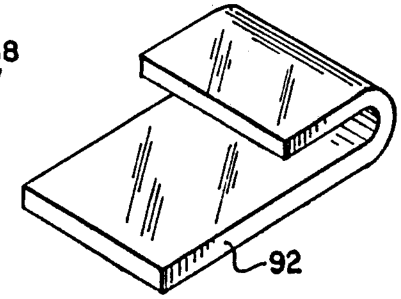
FIG. 15 is a perspective view of a sheet-type light guide.

A plurality of bar-type light guides 86 are provided behind the at least partially transparent outer surface 88 of the sign 80. The light guides 86 shown diagrammatically in FIG. 13 are provided in nested groups, with the ends of particular guides being labeled "X", "O", and "Y" so that the appropriate ends of particular light guides 86 may be identified. It can be seen generally from FIG. 13 that the light guides 86 are operative to direct light incident upon outer region 84 to the inner region 82, with the particular arrangement illustrated in FIG. 14. Light impinging upon the outer portion 84 of outer surface 88 passes therethrough and enters through one end of each of the light guides 86. The light is guided therethrough by internal reflection, and emerges at the opposite ends, from which it is directed onto the rear surface of the at least partially transparent object field 90. Sufficient numbers of light guides 86 are provided to yield adequate illumination to the object field 90. Light guides 86 may, of course, also be of other appropriate types, including the sheet-type light guide 92 illustrated in FIG. 15.

Figure 16:
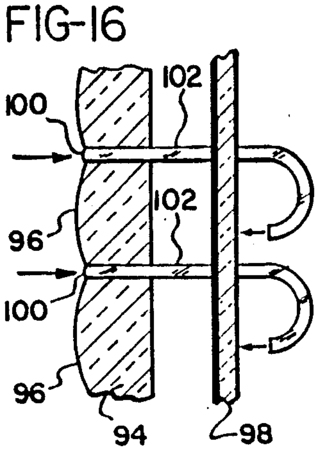
FIG. 16 is a diagram illustrating an alternative embodiment of the display utilizing light guides for illumination of the object field.

Light guides may also be used to direct illumination from areas within the variable aspect display to the object field. As shown in FIG. 16, the lenticular screen 94 includes lens elements 96 corresponding to and directing light to the lens fields of the object field 98. Additionally, portions of lenticular screen 94 are configured to facilitate passage of light guides 102 therethrough. Light guides 102 may be formed integrally with screen 96, or may be positioned after its construction. Light guides 102 are operative to capture a portion of the light impinging upon lenticular screen 94, and then direct the illumination to the rear side of object field 98, where it is used to illuminate the display elements.

It should also be realized that variations on the structures shown in FIGS. 14 and 16 are also possible. In particular, the light guides may be arranged to direct light to the forward side of an opaque object field, rather than to the rearward side.

It will be recognized that light may be directed to illuminate the object field by means other than the light guides described above. In one particular embodiment, one or more mirrors or other specularly reflective surfaces may be arranged at the sides and/or behind the display to direct light impinging thereon to the front or rear of the object field, or to the edge of a transparent field supporting plate or other structure that can guide light over its area. In any of these cases, reflective, refractive or diffusing means may be used to direct light to the viewer from some or all field areas. Additionally, illumination can be gathered from clear interior areas of the display itself, through means analogous to that shown in FIG. 16.

Figure 17:
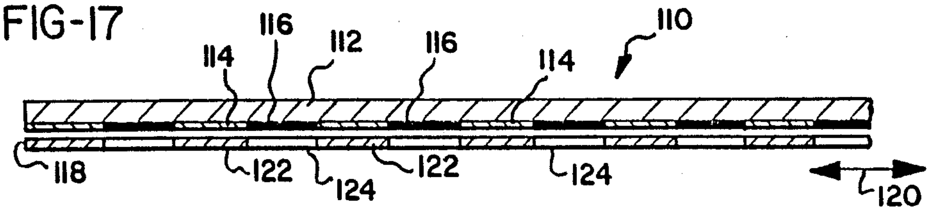
FIG. 17 is a sectional view of a portion of an object field used in providing selective displays.

Another improvement provided by the present invention enables the image cycle presented by the display to be changed depending upon various external circumstances. FIG. 17 illustrates an object field 110 which may be used with a sign (not shown) as has been described herein. Object field 110 includes a support member 112 to which a plurality of differing lens fields 114 and 116 are mounted. A movable grid 118 is supported in front of the member 112, which is laterally movable as indicated by arrow 120. The grid 118 includes alternating lens fields 122 and transparent portions 124, through which either of lens fields 114 or 116 is visible. In this particular example, then, the viewer of the sign would observe the pattern presented by lens field 122, alternating with the pattern presented by either of lens fields 114 or 116, depending upon the positioning of grid 118. Of course, any of the display elements 114, 116 or 122 may be black, so as to provide what appears to be a flashing display.

Variations on this structure may also be used, such as mounting the alternate lens fields on a series of rotating slats, which may be turned selectively to provide the desired images.

It is also possible to provide for a changeable image in response to temperature by including thermochromic means for changing the lens field patterns as a function of temperature. All or a portion of the lens field patterns may be formed of a thermochromic material, so that as the temperature varies, the patterns will change at least partially, thereby providing a change in the display image.

Figure 18:
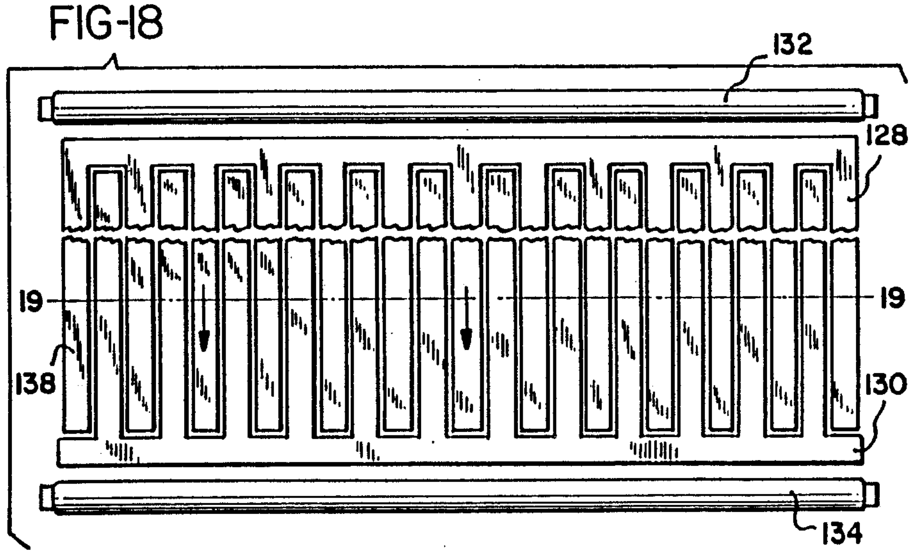
FIG. 18 is an elevational view of an illumination system usable for providing selective displays.
Figure 19:
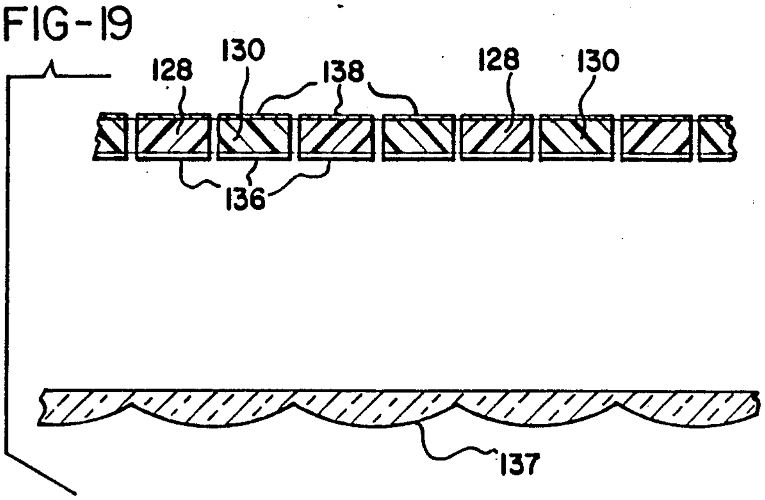
FIG. 19 is a view taken generally along line 19—19 of FIG. 18, including a portion of the lenticular screen.

An additional alternative for providing selective displays is illustrated by the fingered light guides 128 of FIGS. 18 and 19. One of a pair of selectively illuminable lamps 132 and 134 is provided adjacent each of the interlaced, fingered light guides 128 and 130, respectively. The light guides 128 and 130 are positioned immediately behind appropriate lens fields, with the lens fields adjacent the fingers of light guide 128 representing one choice of display, with the lens fields adjacent the fingers of light guide 130 representing another.

Either of lamps 132 and 134 is illuminated, which causes light to be directed into the fingers of the corresponding light guide. Each light guide is at least partially coated on the side away from the lens fields 136 with a reflective material 138 such as paint, so that the light is directed towards the lens fields 136, thereby illuminating the desired ones. Thus the viewer will see the desired pattern through lenticular screen 137, alternating with the darkened lens fields, creating what appears to be a flashing display.

A further technique for providing changeable images involves movement of the object field with respect to the lenticular screen. With reference to the vertically oriented cylindrical lens elements of the preferred embodiment, movement of the object field in a lateral horizontal direction can be used to change the registry of the lens fields with respect to the lens elements. This can change the sequence of the displayed images, for example by moving display elements corresponding to an intermediate image to a position where they will appear first in the sequence. Movement of the object field in a vertical direction can also be used, with display elements for one sequence of images occupying portions of the lens fields above display elements corresponding to a second. Vertical movement along the object field thus has the effect or changing the object field entirely, while maintaining the lens fields and lens elements in proper registry.

The variable aspect display of the present invention is dependent in part for its precise operation upon the exact correspondence between particular lens elements and lens fields. Thus it should be clear that relatively small lateral displacements between lens elements and lens fields can cause significant problems in maintaining the accuracy of the display. To avoid such shifts due to thermal expansion, it is desirable to make the lenticular screen and the object field of the same material or of materials with similar coefficients of thermal expansion. Nonetheless, due to sun, wind, and other effects present in outdoor installations, various portions of the display may be at significantly different temperatures. Accordingly, thermal shifts may be reduced by reducing the distance over which such shifts accumulate. This is accomplished by making one of the structures, preferably the object field, in sections, each section being independently mounted with respect to other sections.

Figure 20:
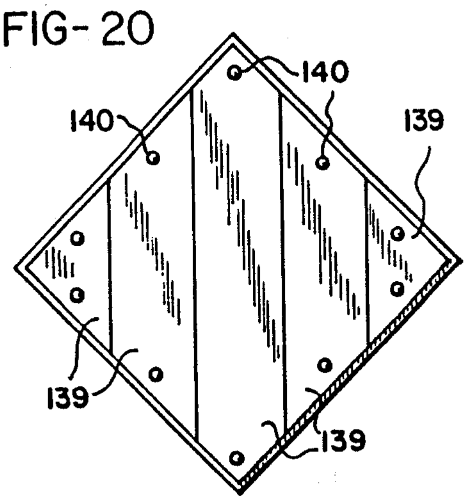
FIG. 20 is a rear view of a variable aspect display constructed for use as a traffic sign.
Figure 21:
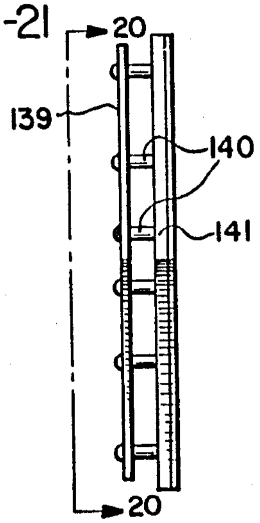
FIG. 21 is a side view of the display of FIG. 20.

One possible arrangement is illustrated in FIGS. 20 and 21, illustrating a sign as seen from the rear and side, respectively. Each of five object field sections 139 is supported on a pair of studs 140 from a solid lenticular screen 141. When used with a sign having vertically-oriented cylindrical lens elements, at least one of the studs 140 of each pair, or its attachment at one or both ends, may have provision for allowing relative motion in the vertical direction of the sign to allow for differential expansion.

It should also be noted at this point that a variable aspect display having changeable images is well suited for use as a component of a larger integrated system. For example, again referring to vehicular traffic control, appropriate sensing or monitoring devices can be provided for determining changeable traffic conditions, such as wet or icy pavement, road construction ahead, congested traffic, or the like. These devices can be coupled to a variable aspect display utilizing the techniques for changing images described herein. The display can then in turn provide appropriate warning or directional messages as the conditions may warrant.

Figure 22:
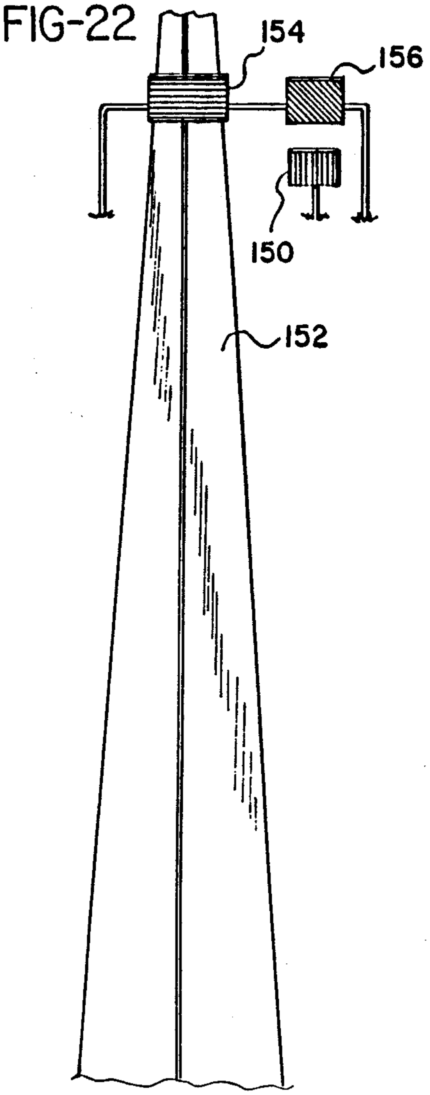
FIG. 22 is a perspective view of a variety of installations of the variable aspect display for use as traffic signs, illustrating the orientation of cylindrical lens elements.

While the present invention has been described primarily with reference to a sign utilizing cylindrical lens elements oriented in the vertical direction, it is to be understood that orientation of these preferred lens elements is dependent upon the particular installation and anticipated use of the variable aspect display. It will be realized that the cylindrical lens elements must be oriented so that the axes of the cylinders are at an angle, preferably perpendicular, to the plane defined by the lines of sight between the anticipated viewing positions and the display itself. Thus, as seen in FIG. 22, a sign 150 located at the side of a road 152, and at substantially the same height as a driver of a vehicle, uses cylindrical lens elements oriented in the vertical direction. An overhead sign 154, however, mounted over the driving lanes of road 152, will have the cylindrical lens elements oriented in the horizontal direction. Finally, a sign 156 mounted over but to the side of the road 152 may have cylindrical lens elements oriented in a diagonal direction.

Figure 23:
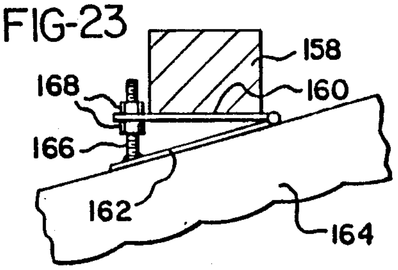
FIG. 23 is a top view of a portion of a variable aspect display and a signpost, illustrating mounting of the display to provide for angular adjustment thereof.

In should be apparent from the foregoing description that proper operation of the variable aspect display is dependent upon proper angular positioning of the display as a whole with respect to the anticipated path of travel of the viewer toward the display. Thus, careful initial positioning during installation is important, and occasional subsequent repositioning may be needed. Accordingly, the display may be provided with means for selecting its overall angular positioning. One embodiment of such means is shown in FIG. 23, although it will be recognized that many variations are possible. A signpost 158 is mounted within the ground or otherwise secured, to which a plate 160 is attached. Plate 160 is hingedly connected to a second plate 162, to which in turn a variable aspect display in the form of sign 164 is mounted. A threaded stud 166 is fixedly attached to plate 162, passing through plate 160. Adjusting nuts 168 are engaged on stud 166, on either side of plate 160, whereby the angular position of sign 164 may be adjusted and then fixed.

Figure 24:
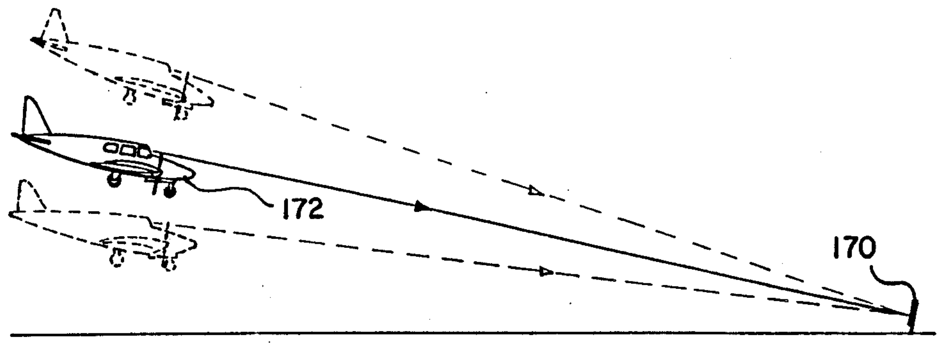
FIG. 24 is an elevational view illustrating use of the variable aspect display as an aircraft landing path indicator.

Several particular applications of the variable aspect display of the present invention should be noted. As shown in FIG. 24, a variable aspect display 170 may be provided as a landing approach or guide path indicator for an airplane 172 or the like. The display 170 may be provided with appropriate patterns or colors of light such that in the event the airplane 172 flies either above or below the correct approach path, the display will change from an indication of approval to an indication of warning. In addition, by using spherical lens elements and lens fields, rather than cylindrical, the display 170 may be adapted to give indication of horizontal positioning of the airplane 172 as Well as vertical.

The variable aspect display may also be used as a traffic control or warning sign for pedestrian, rather than vehicular, traffic. The display is erected near a defined pedestrian walkway, such as a sidewalk, pedestrian overpass, or the like, and is provided with appropriate images as has been described herein. It may be used in other situations, for example in corridors or in aisles in department stores, where it may be used to guide shoppers or to give advertising messages.

Figure 25:
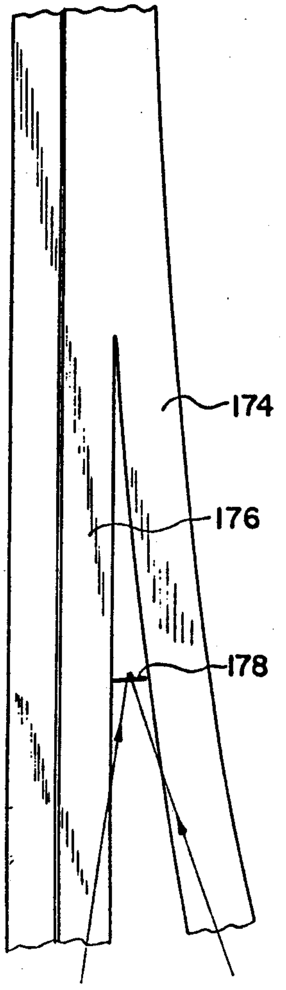
FIG. 25 is a plan view illustrating use of the variable aspect display for presenting differing indications to viewers on differing paths of travel.

An additional application is shown in FIG. 25 where two highway lanes 174 and 176 merge into one. A variable aspect sign 178 is positioned so as to be visible from drivers of vehicles on either of lanes 174 or 176, with the lens fields of the sign 178 adapted to provide one set of images for viewing angles traversed by vehicles in lane 174, and a second set of images for viewing angles traversed by vehicles in lane 176. The images visible from lane 174 may give indications such as "yield", while the images visible from lane 176 may give indications such as "merging traffic".

Figure 26:
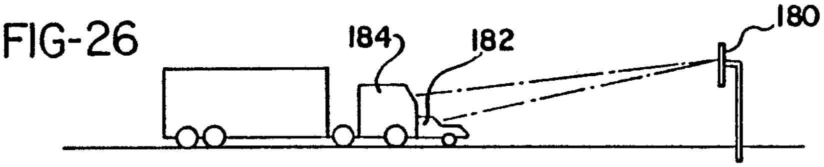
FIG. 26 is an elevational view illustrating use of an overhead variable aspect display for providing different messages to drivers of different types of vehicles.

Other variations may be accomplished using the techniques described herein. Different messages may be made visible to different groups of viewers, for instance to vehicle drivers proceeding in different lanes of a multi-lane highway or drivers of vehicles that are carried by their respective vehicles at different heights. In FIG. 26, an overhead sign 180 carries one message to be seen by the driver of a passenger car 182 and another to be seen by the driver of a large truck 184. Each sees only the message intended for him since each views sign 180 at different viewing angles. Of course, when car 182 had been at a much greater distance from sign 180, its driver would have been at a viewing angle such as to see the message intended for the driver of truck 184. At such a distance, however, the message displayed on sign 180 may have been illegible or of no immediacy to him.

Throughout the description of the present invention, the images presented by the variable aspect display have often been described in terms of images presenting a message, either textual or graphic. It should be understood that the image presented by the display can also be as simple as a single area of color that alternates between shades. In one example, two displays that alternate between areas of yellow and black can be mounted one each on either side of a conventional traffic sign. The lens field patterns of each display may be arranged such that when one display is yellow, the other is black, and vice versa. With selection of a proper rate of change for the display images, and compensating for parallax and rate of viewing angle change between the two displays as has been described herein, the effect will be very similar to that produced by electrically-powered "flashers" installed adjacent the sign. The great advantage with the variable aspect display, however, is that no source of electrical energy is needed.

Other contributions, using various numbers of display elements and other possible time sequences, are to be understood as being within the scope of the invention. For example, a series of displays may be mounted about the periphery of a conventional sign, each alternating between bright and dark. Proper selection of change rates may be made to provide the visual effect of the bright region moving circularly around the sign.

Finally, it will be noted that the present invention provides a variety of means and devices incorporated into a variable aspect display, each of which has been described independently herein. It should be recognized, however, that the present invention encompasses any and all combinations of the various means and devices into a single variable aspect display. Further, it is anticipated that the most practical examples of the present invention will include some combination of the various features presented herein.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A variable aspect display, comprising:

a lenticular screen having a series of discrete lens elements;

a non-planar object field supported behind said lenticular screen at or near the foci of said lens elements;

said object field being divided into a plurality of lens fields, each of said lens fields corresponding to one of said lens elements and extending across substantially the entire intended viewing angle for its respective one of said lens elements for the intended range of viewing directions for said variable aspect display;

said lens fields each being divided into a plurality of display elements to form a pattern, said display elements selectively visible to a viewer through said lenticular screen as a function of the angular position of the viewer in relation thereto; and said object field including means for extending each of said lens fields, along at least one edge thereof, toward said lenticular screen to shield adjacent ones of said lens fields from being viewed at off-center viewing angles through ones of said lens elements not associated therewith, thereby to continue presenting the proper corresponding ones of said lens fields to the particular individual ones of said lens elements associated therewith when viewed at such off-center viewing angles;

said display elements being positioned along said means for extending said lens fields, whereby at least a portion of each of said patterns extends toward said lenticular screen, thereby positioning said patterns at distances from said lens elements at least partially compensating for the curvature of field of said lens elements at off-center viewing angles.

2. The variable aspect display of claim 1, wherein said lens elements are a plurality of mutually parallel cylindrical lenses, and wherein said means for extending said lens fields includes each said lens field shaped to define a concave-forward portion of a cylinder having an axis parallel to the axis of its respective one of said lens elements.

3. The variable aspect display of claim 2, wherein said cylinder is a circular cylinder.

4. The variable aspect display of claim 1, wherein said means for extending said lens fields includes a plurality of baffles mounted to said object field and extending toward said lenticular screen, said baffles being positioned on said object field to define the divisions of said object field into said plurality of lens fields, each of said baffles carrying on at least a portion thereof a part of said pattern of a respective one of said lens fields.

* * * * *